(12) United States Patent
Yoshida et al.

(10) Patent No.: US 11,506,459 B2
(45) Date of Patent: Nov. 22, 2022

(54) DOUBLE PIPE

(71) Applicant: MARELLI CABIN COMFORT JAPAN CORPORATION, Saitama (JP)

(72) Inventors: Hiroyuki Yoshida, Saitama (JP); Jun Hatakeyama, Saitama (JP); Hiroyuki Oono, Saitama (JP)

(73) Assignee: MARELLI CABIN COMFORT JAPAN CORPORATION, Saitama (JP)

( * ) Notice: Subject to any disclaimer, the term of this patent is extended or adjusted under 35 U.S.C. 154(b) by 11 days.

(21) Appl. No.: 16/084,966

(22) PCT Filed: Mar. 9, 2017

(86) PCT No.: PCT/JP2017/009548
§ 371 (c)(1),
(2) Date: Sep. 13, 2018

(87) PCT Pub. No.: WO2017/159542
PCT Pub. Date: Sep. 21, 2017

(65) Prior Publication Data
US 2019/0107341 A1 Apr. 11, 2019

(30) Foreign Application Priority Data
Mar. 14, 2016 (JP) .............................. JP2016-049833

(51) Int. Cl.
*F28F 13/12* (2006.01)
*F28D 7/10* (2006.01)
(Continued)

(52) U.S. Cl.
CPC ............... *F28F 13/12* (2013.01); *F16L 9/18* (2013.01); *F25B 40/00* (2013.01); *F28D 7/10* (2013.01); *F28F 1/40* (2013.01)

(58) Field of Classification Search
CPC ..... F28F 13/12; F28F 1/40; F16L 9/18; F28D 7/10; F25B 40/00; F25B 2400/054
(Continued)

(56) References Cited

U.S. PATENT DOCUMENTS 1,335,506 A * 3/1920 Jones .................... F28D 7/1669
165/161
1,459,024 A * 6/1923 Hartburg ................. F28F 13/12
29/890.03
(Continued)

FOREIGN PATENT DOCUMENTS

CN 101995184 A 3/2011
CN 202057213 U 11/2011
(Continued)

*Primary Examiner* — Eric S Ruppert
*Assistant Examiner* — Kirstin U Oswald
(74) *Attorney, Agent, or Firm* — Foley & Lardner LLP

(57) ABSTRACT

A double pipe includes an inner pipe through an interior of which low pressure gaseous cooling medium flows and an outer pipe having the inner pipe in its interior, the outer pipe being configured such that high-pressure liquid cooling medium flows between the inner pipe and the outer pipe, wherein the inner pipe has a plate member that extending in the longitudinal direction so as to partition the interior of the inner pipe into a plurality of chambers. The plate member has a helical shape along the longitudinal direction.

4 Claims, 8 Drawing Sheets

(51) Int. Cl.
*F28F 1/40* (2006.01)
*F25B 40/00* (2006.01)
*F16L 9/18* (2006.01)

(58) Field of Classification Search
USPC ....... 62/513; 165/109.1, 114, 154, 157, 159, 165/160, 163, 164, 177, 183, 184; 138/37, 42, 43, 46, 108, 114
See application file for complete search history.

(56) References Cited

U.S. PATENT DOCUMENTS

| | | | | |
|---|---|---|---|---|
| 1,818,082 | A * | 8/1931 | Mott | F28D 7/12 |
| | | | | 165/172 |
| 2,532,179 | A * | 11/1950 | Miller | F25B 33/00 |
| | | | | 126/307 R |
| 2,674,104 | A * | 4/1954 | Street | F28F 13/12 |
| | | | | 374/163 |
| 2,864,405 | A * | 12/1958 | Young | F01P 11/08 |
| | | | | 416/96 A |
| 2,895,508 | A * | 7/1959 | Drake | F28F 1/40 |
| | | | | 138/38 |
| 2,943,845 | A * | 7/1960 | Jaklitsch | F28D 7/026 |
| | | | | 366/280 |
| 3,088,495 | A * | 5/1963 | Svec | F16L 9/127 |
| | | | | 174/DIG. 11 |
| 3,235,003 | A * | 2/1966 | Smith | F01N 13/18 |
| | | | | 181/239 |
| 3,423,294 | A * | 1/1969 | Sephton | C02F 1/08 |
| | | | | 55/346 |
| 3,440,830 | A * | 4/1969 | Kite | F17C 6/00 |
| | | | | 62/50.7 |
| 3,457,982 | A * | 7/1969 | Sephton | C02F 1/08 |
| | | | | 261/114.1 |
| 3,730,229 | A * | 5/1973 | D'Onofrio | F28F 1/08 |
| | | | | 165/184 |
| 3,949,970 | A * | 4/1976 | ter Braak | F28F 13/12 |
| | | | | 239/432 |
| 4,258,782 | A * | 3/1981 | Kao | F28F 1/12 |
| | | | | 165/184 |
| 4,321,908 | A * | 3/1982 | Reed | E03B 7/10 |
| | | | | 138/28 |
| 4,461,743 | A * | 7/1984 | Chowdhury | B01J 4/001 |
| | | | | 422/198 |
| 4,564,066 | A * | 1/1986 | Gorman | F28F 13/125 |
| | | | | 165/95 |
| 4,641,705 | A * | 2/1987 | Gorman | F28F 13/125 |
| | | | | 165/174 |
| 4,794,980 | A * | 1/1989 | Raisanen | F28F 21/084 |
| | | | | 165/154 |
| 4,823,865 | A * | 4/1989 | Hughes | F28F 13/12 |
| | | | | 138/38 |
| 4,869,230 | A * | 9/1989 | Fletcher | F23C 3/002 |
| | | | | 431/114 |
| 5,799,395 | A * | 9/1998 | Nording | F16L 51/00 |
| | | | | 29/890.036 |
| 7,866,378 | B2 * | 1/2011 | Nakamura | F25B 40/00 |
| | | | | 29/890.036 |
| 9,091,487 | B2 * | 7/2015 | Byon | F28D 7/14 |
| 2007/0246117 | A1 | 10/2007 | Naganawa et al. | |
| 2008/0202156 | A1 * | 8/2008 | Baek | F25B 43/006 |
| | | | | 62/503 |
| 2010/0018246 | A1 * | 1/2010 | Wolfe, IV | F28D 7/022 |
| | | | | 165/154 |
| 2010/0206001 | A1 | 8/2010 | Takahashi et al. | |
| 2013/0186142 | A1 * | 7/2013 | Nagata | F16L 9/18 |
| | | | | 65/83 |
| 2015/0323263 | A1 | 11/2015 | Yanachi et al. | |

FOREIGN PATENT DOCUMENTS

| | | | | |
|---|---|---|---|---|
| DE | 19729725 | A1 | 1/1999 | |
| DE | 19729725 | A1 * | 1/1999 | ............ F01N 5/02 |
| GB | 1338495 | A * | 1/1973 | ............ F28B 1/02 |
| GB | 1 338 495 | A | 11/1973 | |
| GB | 1338495 | A * | 11/1973 | ............ F28F 1/422 |
| JP | S57-190288 | | 12/1982 | |
| JP | H01-101092 | U | 7/1989 | |
| JP | 2003-329376 | A | 11/2003 | |
| JP | 2006-162241 | A | 6/2006 | |
| JP | 2007-175756 | A | 7/2007 | |
| JP | 2008-074388 | A | 4/2008 | |
| JP | 4350079 | B2 | 10/2009 | |
| JP | 2011-027285 | A | 2/2011 | |
| JP | 2011027285 | A * | 2/2011 | ............ F28F 1/40 |
| JP | 2013-002657 | A | 1/2013 | |
| JP | 2013-061138 | A | 4/2013 | |
| JP | 2015-128916 | A | 7/2015 | |
| WO | WO2014/091558 | A1 | 6/2014 | |
| WO | WO-2015186147 | A1 * | 12/2015 | ............ F16L 43/001 |

* cited by examiner

DOUBLE PIPE

CROSS-REFERENCE TO RELATED APPLICATIONS

This application is a National Phase of International Patent Application No. PCT/JP2017/009548, filed Mar. 9, 2017, which claims priority to Japanese Patent Application No. 2016-049833, filed Mar. 14, 2016. The contents of these applications are herein incorporated by reference in their entirety.

TECHNICAL FIELD

The present invention relates to a double pipe.

BACKGROUND ART

JP4350079B2 discloses a refrigeration cycle device including a double pipe in which two pipes are arranged in a concentric manner. In the double pipe disclosed in JP4350079B2, a low-temperature, low-pressure gaseous cooling medium flows through an interior of an inner pipe, and a high-temperature, high-pressure liquid cooling medium flows through a space between the inner pipe and an outer pipe. Thus, heat exchange is performed between the gaseous cooling medium in the interior of the inner pipe and the liquid cooling medium outside the inner pipe through the inner pipe.

SUMMARY OF INVENTION

However, with the double pipe disclosed in JP4350079B2, because the flow speed of the gaseous cooling medium flowing through the interior of the inner pipe is higher in a central portion of the inner pipe than in its surrounding, the flow of the gaseous cooling medium tends to be concentrated to the central portion of the inner pipe, and the gaseous cooling medium may pass through the double pipe before the heat exchange is performed. As a result, the heat exchange efficiency between the gaseous cooling medium and the liquid cooling medium through the inner pipe may be lowered.

In addition, with the double pipe disclosed in JP4350079B2, although protrusions and recesses are formed helically on a surface of the inner pipe, they do not form a structure for supporting the structure of the inner pipe itself. Therefore, the inner pipe may be crushed due to a pressure difference between the interior of the inner pipe through which the low-temperature, low-pressure gaseous cooling medium flows and an exterior of the inner pipe through which the high-temperature, high-pressure liquid cooling medium flows (internal/external pressure difference). As a result, a rigidity needs to be secured by increasing a thickness of the inner pipe, and it is difficult to increase the heat exchange efficiency between the gaseous cooling medium and the liquid cooling medium.

An object of the present invention is to provide a double pipe capable of preventing an inner pipe from being crushed due to an internal/external pressure difference and capable of improving a heat exchange efficiency between a gaseous cooling medium and a liquid cooling medium.

According to one aspect of the present invention, a double pipe includes: an inner pipe through an interior of which low-pressure first fluid flows and an outer pipe having the inner pipe in its interior, the outer pipe being configured such that high-pressure second fluid flows between the inner pipe and the outer pipe, wherein the inner pipe has a plate member extending in a longitudinal direction so as to partition the interior of the inner pipe into a plurality of chambers, the plate member has a helical shape along the longitudinal direction, and a plate thickness of the inner pipe is thinner than a plate thickness of the outer pipe.

According to the above-mentioned aspect, because the helical plate member is extended in the longitudinal direction so as to partition the interior of the inner pipe into a plurality of chambers, the first fluid flowing in the interior of the inner pipe is stirred by the plate member. In addition, the first fluid is subjected to heat exchange with the second fluid not only through the inner pipe but also through the plate member. Furthermore, because the inner pipe is held helically from the inside of the inner pipe by the helical plate member, the rigidity is increased over the whole radial directions. As a result, the inner pipe is prevented from being crushed due to the internal/external pressure difference, and it is possible to improve a heat exchange efficiency between the first fluid and the second fluid through the inner pipe and the plate member.

DESCRIPTION OF EMBODIMENTS

An embodiment of the present invention will be described below with reference to the drawings.

Figure 1:
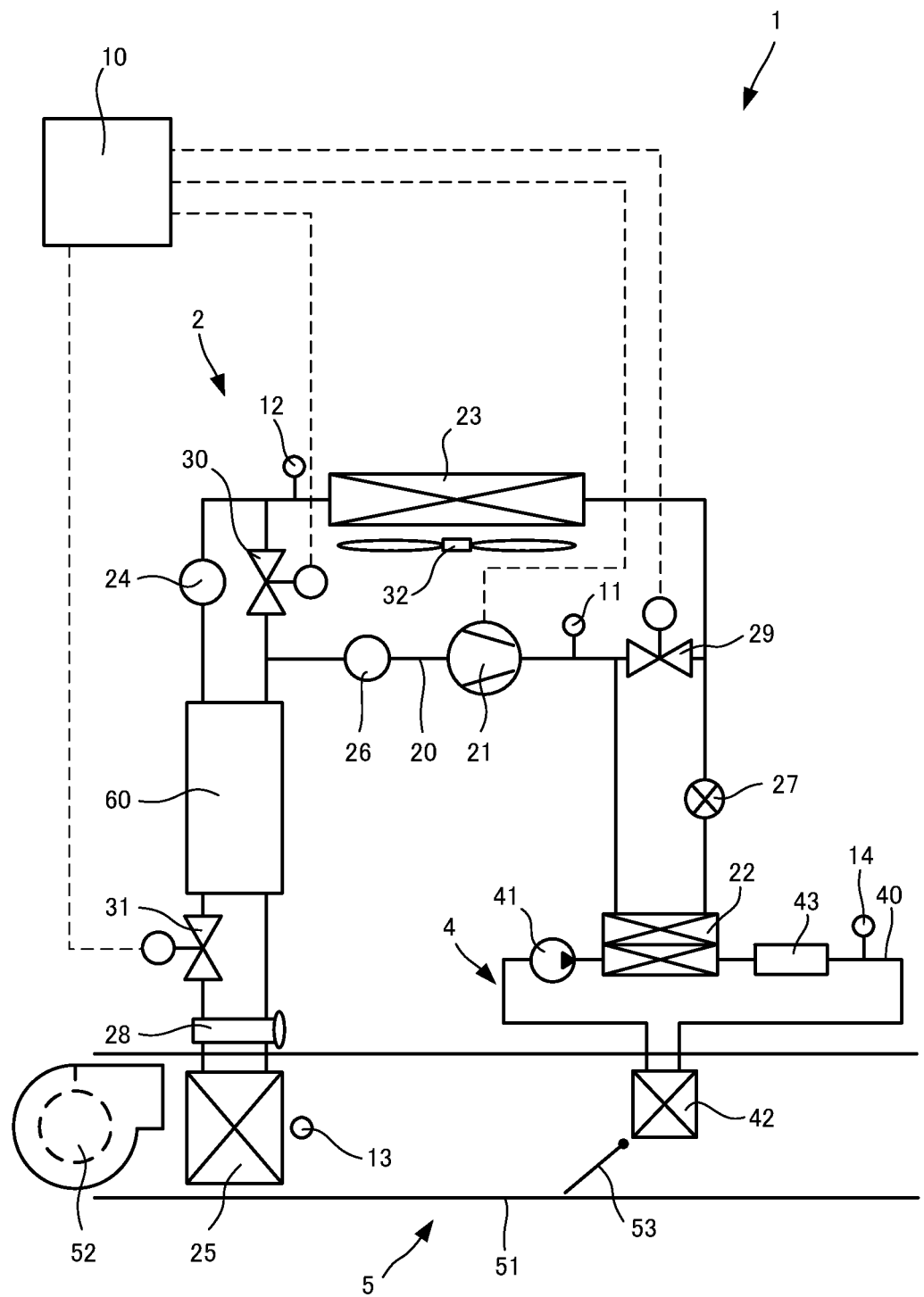
FIG. 1 is a configuration diagram of an air-conditioning device to which a double pipe according to an embodiment of the present invention is applied.

FIG. 1 is a schematic configuration diagram showing an air-conditioning device 1 to which a double pipe 61 according to the embodiment of the present invention is applied.

The air-conditioning device 1 is a heat pump system capable of performing a cabin cooling operation and a cabin heating operation including a refrigeration cycle 2 through which cooling medium circulates, a high-water temperature cycle 4 through which hot water circulates, an HVAC (Heating Ventilation and Air Conditioning) unit 5 through which air used for air-conditioning in a vehicle cabin passes, and a controller 10 that controls operation of valves, etc. For example, HFC-134a is used as the cooling medium, and an antifreeze is used as the hot water.

The refrigeration cycle 2 includes a compressor 21, a fluid-cooled condenser 22, an external heat exchanger 23, a liquid tank 24, an internal heat exchanger 60, an evaporator 25, an accumulator 26, and a cooling medium flow path 20 that connects these components such that the cooling medium can circulates therethrough.

The compressor 21 sucks and compresses gaseous cooling medium. Thus, the temperature and the pressure of the gaseous cooling medium become high.

The fluid-cooled condenser 22 functions as a condenser with which the cooling medium that has passed through the compressor 21 is condensed when a cabin heating operation is performed. The fluid-cooled the condenser 22 performs heat exchange between the cooling medium the temperature and the pressure of which have been increased by the compressor 21 and the hot water circulating through the high-water temperature cycle 4, and thereby, the heat of the cooling medium is transferred to the hot water.

The external heat exchanger 23 is provided in an engine compartment of a vehicle, for example (in a motor compartment of an electric car), and performs the heat exchange between the cooling medium and outside air. The external heat exchanger 23 functions as the condenser when the cabin cooling operation is performed and functions as an evaporator when the cabin heating operation is operated. The outside air is introduced into the external heat exchanger 23 as the vehicle is traveled or an external fan 32 is rotated.

When the cabin cooling operation is performed, the liquid tank 24 temporarily stores the cooling medium that has passed through the external heat exchanger 23 and that has been condensed, and performs gas/liquid separation of the cooling medium into the gaseous cooling medium and liquid cooling medium. Only the separated liquid cooling medium flows into the internal heat exchanger 60 from the liquid tank 24.

Figure 2:
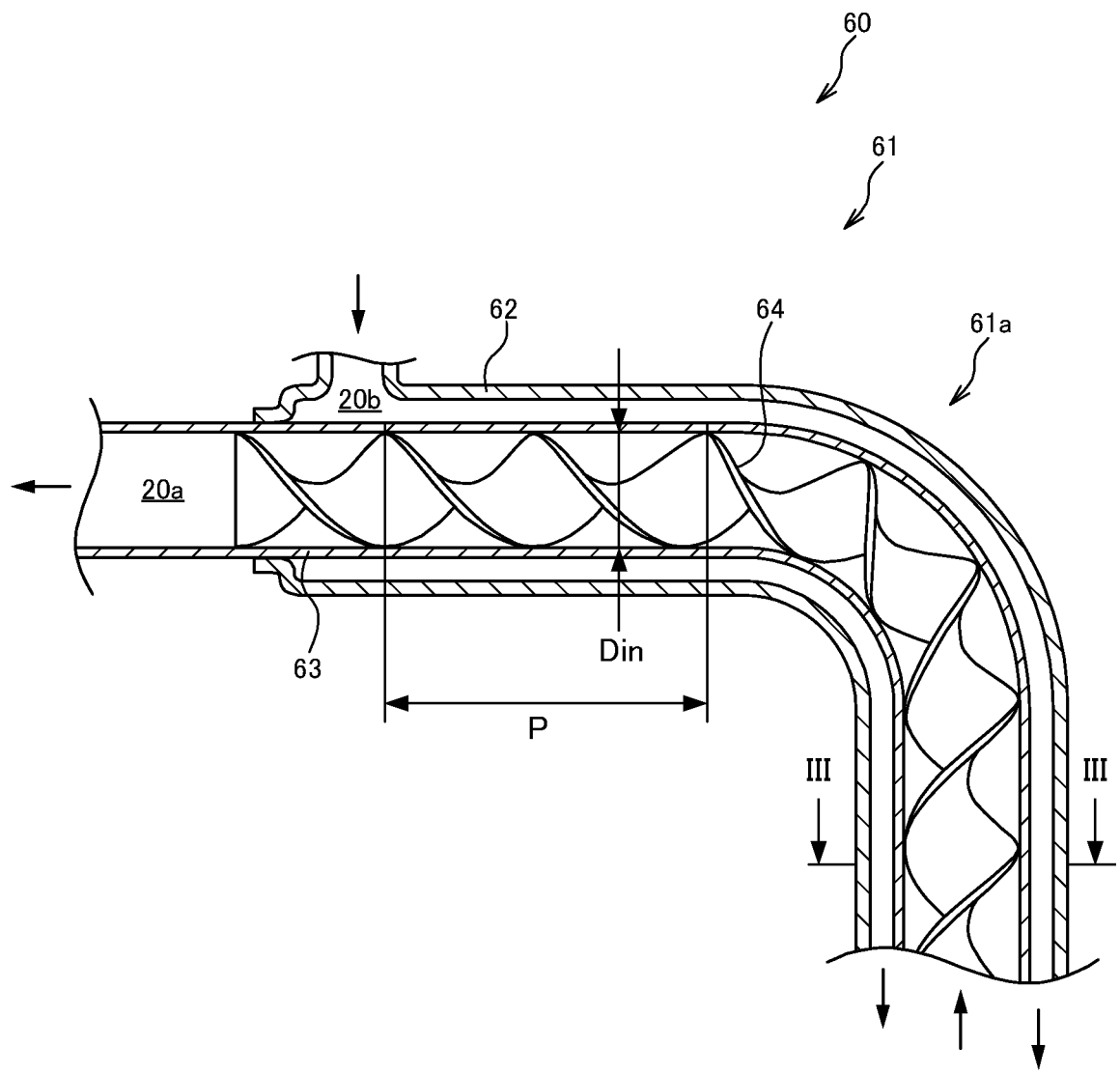
FIG. 2 is a schematic configuration diagram of the double pipe provided in an internal heat exchanger of the air-conditioning device.
Figure 3:
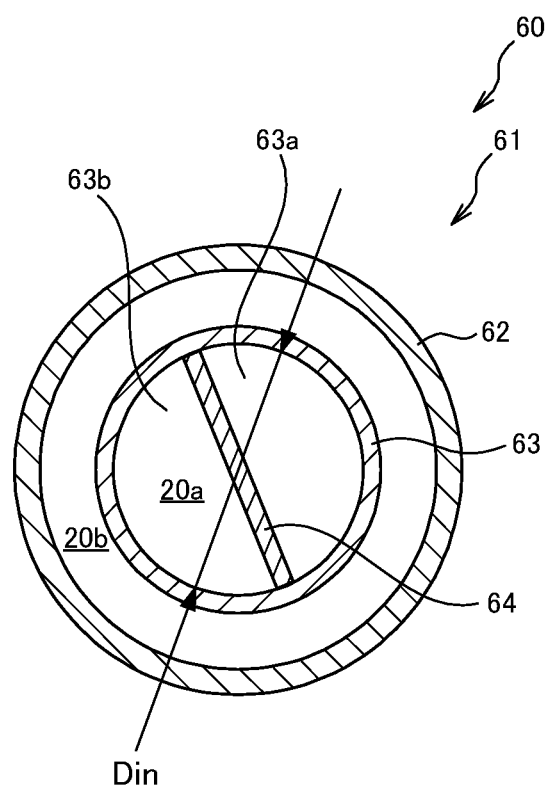
FIG. 3 is a sectional view taken along a line III-III in FIG. 2.

The internal heat exchanger 60 is a heat exchanger provided with the double pipe 61 that performs the heat exchange by using temperature difference of the cooling media in the cooling medium flow path 20. The double pipe 61 of the internal heat exchanger 60 will be described in detail using FIGS. 2 and 3. FIG. 2 is a schematic configuration diagram of the double pipe 61, and FIG. 3 is a sectional view taken along a line III-III in FIG. 2.

The double pipe 61 includes an inner pipe 63 and an outer pipe 62 having the inner pipe 63 in an interior thereof. Each of the inner pipe 63 and the outer pipe 62 is formed to have a tubular shape so as to have a hollow space in the interior thereof.

In the interior of the inner pipe 63, an inner flow path 20a through which the gaseous cooling medium flows is formed. An outer flow path 20b through which the liquid cooling medium flows is formed between the inner pipe 63 and the outer pipe 62.

The low pressure gaseous cooling medium flowing from the evaporator 25 in the cooling medium flow path 20 to the accumulator 26 flows through the inner flow path 20a. The high pressure liquid cooling medium flowing from the liquid tank 24 in the cooling medium flow path 20 to a second expansion valve 28 flows through the outer flow path 20b. Thus, the heat exchange is performed through the inner pipe 63 between the gaseous cooling medium flowing through the inner flow path 20a and the liquid cooling medium flowing through the outer flow path 20b.

In order to improve the heat exchange efficiency between the gaseous cooling medium and the liquid cooling medium, the inner pipe 63 is formed to have a thin plate thickness. On the other hand, in order to secure a pressure resistance of the double pipe 61, the outer pipe 62 is formed to have a thick plate thickness. Therefore, the plate thickness of the inner pipe 63 is configured to be thinner than the plate thickness of the outer pipe 62.

As shown in FIGS. 2 and 3, a plate member 64 that extends in the longitudinal direction is inserted in the interior of the inner pipe 63.

The plate member 64 is a metal plate having a width equal to an inner diameter Din of the inner pipe 63. The plate member 64 partitions the interior of the inner pipe 63 into two chambers 63a and 63b. The gaseous fluid flowing through the interior of the inner pipe 63, in other words the inner flow path 20a, flows through each of the chambers 63a and 63b.

The plate member 64 is formed to have a helical shape along the longitudinal direction by supporting both end in the longitudinal direction, and by rotating and twisting one end about the central axis in the longitudinal direction. The plate member 64 is formed such that a helical periodicity P is longer than the inner diameter Din of the inner pipe 63. It is possible to insert the plate member 64 into the inner pipe 63 because the plate member 64 is twisted to the helical shape and its size becomes slightly smaller than the inner diameter Din of the inner pipe 63.

As described above, the inner pipe 63 and the plate member 64 are formed separately, and thereafter, the plate member 64 is inserted into the inner pipe 63.

The double pipe 61 shown in FIG. 2 is formed by assembling the inner pipe 63 into which the plate member 64 has been inserted to the interior of the outer pipe 62. Because the inner pipe 63 is held helically from the inside by the inserted plate member 64, and thereby, the rigidity in the radial direction is increased in all directions. Thereafter, a part of the double pipe 61 is bent to form a bent portion 61a in the double pipe 61.

In the interior of the bent portion 61a, the inner pipe 63 is also bent in a similar manner as the outer pipe 62. By bending the inner pipe 63, the outer side of the inner pipe 63 is stretched. The plate member 64 inserted into the interior of the inner pipe 63 is also bent so as to follow the shape of the inner pipe 63, and thereby, the plate member 64 is fit and fixed to an inner wall of the inner pipe 63. The plate member 64 may be fixed to the inner pipe 63 by welding or brazing both ends in the longitudinal direction.

Referring back to FIG. 1, the evaporator 25 is arranged in the HVAC unit 5, and when the cabin cooling operation is performed, the evaporator 25 evaporates the cooling medium by causing the cooling medium to absorb the heat of the air passing through the evaporator 25. the cooling medium evaporated by the evaporator 25 flows into the accumulator 26 through the internal heat exchanger 60.

The accumulator 26 temporarily stores the cooling medium flowing in the cooling medium flow path 20 and performs the gas/liquid separation of the cooling medium into the gaseous cooling medium and the liquid cooling medium. Only the separated gaseous cooling medium flows into the compressor 21 from the accumulator 26.

The cooling medium flow path 20 is arranged with a first expansion valve 27 and the second expansion valve 28 that causes the cooling medium to be decompressed and expanded. In addition, the cooling medium flow path 20 is arranged with a first open/close valve 29, a second open/close valve 30, and a third open/close valve 31 that respectively switch the flows of the cooling medium by being opened/closed.

The first expansion valve 27 is arranged between the fluid-cooled the condenser 22 and the external heat exchanger 23, and causes the cooling medium that has been condensed in the fluid-cooled the condenser 22 to be decompressed and expanded. As the first expansion valve 27, for example, a fixed restrictor or a variable restrictor is used. As the fixed restrictor, for example, an orifice or a capillary tube may be used, and the amount of restriction is set so as to cope with, in advance, specific operation conditions that are used frequently. In addition, as the variable restrictor, for example, a solenoid valve capable of performing stepwise or continuous adjustment of the opening degree may be used.

The second expansion valve 28 is arranged between the internal heat exchanger 60 and the evaporator 25, and causes the cooling medium that has passed through the internal heat exchanger 60 to be decompressed and expanded. As the second expansion valve 28, a thermostatic expansion valve that adjusts its opening degree on the basis of the temperature of the cooling medium that has passed through the evaporator 25 is used.

The first open/close valve 29 and the third open/close valve 31 are opened when the cabin cooling operation is performed and are closed when the cabin heating operation is operated. As the first open/close valve 29 is opened, the cooling medium that has been compressed in the compressor 21 flows directly into the external heat exchanger 23. In addition, as the third open/close valve 31 is opened, the liquid cooling medium that has passed through the internal heat exchanger 60 flows into the evaporator 25.

The second open/close valve 30 is opened when the cabin heating operation is operated and is closed when the cabin cooling operation is performed. As the second open/close valve 30 is opened, the cooling medium evaporated in the external heat exchanger 23 flows directly into the accumulator 26.

As shown in FIG. 1, the high-water temperature cycle 4 includes a water pump 41, a heater core 42, an auxiliary heating device 43, the fluid-cooled the condenser 22, and a hot water flow path 40 that connects these components such that the hot water can circulate therethrough.

The water pump 41 pumps the hot water in the hot water flow path 40 such that the hot water is circulated therethrough.

The heater core 42 is arranged in the HVAC unit 5, and when the cabin heating operation is operated, heats the air passing through the heater core 42 by causing the air to absorb the heat of the hot water.

The auxiliary heating device 43 has an inner heater (not shown) to heat the hot water passing therethrough. As the heater, for example, a sheathed heater or a PTC (Positive Temperature Coefficient) heater may be used.

The HVAC unit 5 cools or heats the air used for the air-conditioning. The HVAC unit 5 is provided with a blower 52 that sends the air and an air mix door 53 that adjusts the amount of the air passing through the heater core 42. The heater core 42 and the evaporator 25 are arranged in the HVAC unit 5, and the air sent from the blower 52 is subjected to the heat exchange with the cooling medium flowing in the heater core 42 and the evaporator 25.

The blower 52 is an air blower that sends the air into the HVAC unit 5.

The air mix door 53 is arranged on the blower 52 side of the heater core 42 that is arranged in the HVAC unit 5. The air mix door 53 opens the heater core 42 side when the cabin heating operation is operated and closes the heater core 42 side when the cabin cooling operation is performed. Depending on the opening degree of the air mix door 53, the amount of the heat exchange between the air and the hot water in the heater core 42 is adjusted.

The air-conditioning device 1 is provided with a discharge pressure sensor 11, an external heat-exchanger-exit temperature sensor 12, an evaporator temperature sensor 13, and a water temperature sensor 14.

The discharge pressure sensor 11 is arranged on the discharge side of the compressor 21 in the cooling medium flow path 20, and detects the pressure of the gaseous cooling medium that has been compressed in the compressor 21.

The external heat-exchanger-exit temperature sensor 12 is arranged in the vicinity of an exit of the external heat exchanger 23 in the cooling medium flow path 20 and detects the temperature of the cooling medium that has passed through the external heat exchanger 23. The external heat-exchanger-exit temperature sensor 12 may also be arranged at the exit portion of the external heat exchanger 23.

The evaporator temperature sensor 13 is arranged on the downstream side of the air flow of the evaporator 25 in the HVAC unit 5 and detects the temperature of the air that has passed through the evaporator 25. The evaporator temperature sensor 13 may be arranged directly on the evaporator 25.

The water temperature sensor 14 is arranged in the vicinity of the exit of the auxiliary heating device 43 in the hot water flow path 40 and detects the temperature of the hot water that has passed through the auxiliary heating device 43.

The controller 10 includes a CPU, a ROM, a RAM, and so forth, and various functions of the air-conditioning device 1 are exhibited by reading out programs stored in the ROM with the CPU. Signals from the discharge pressure sensor 11, the external heat-exchanger-exit temperature sensor 12, the evaporator temperature sensor 13, and the water temperature sensor 14 are input to the controller 10. Signals from an outside-air temperature sensor (not shown) etc. may also be input to the controller 10.

The controller 10 performs control of the refrigeration cycle 2 on the basis of the input signals. In other words, as shown by broken lines in FIG. 1, the controller 10 sets the output from the compressor 21 and performs open/close control of the first open/close valve 29, the second open/close valve 30, and the third open/close valve 31. In addition, the controller 10 also performs control of the high-water temperature cycle 4 and the HVAC unit 5 by sending output signals (not shown).

Next, each of the air-conditioning operation modes of the air-conditioning device 1 will be described with reference to FIGS. 4 and 5.

Cabin Heating Operation Mode

Figure 4:
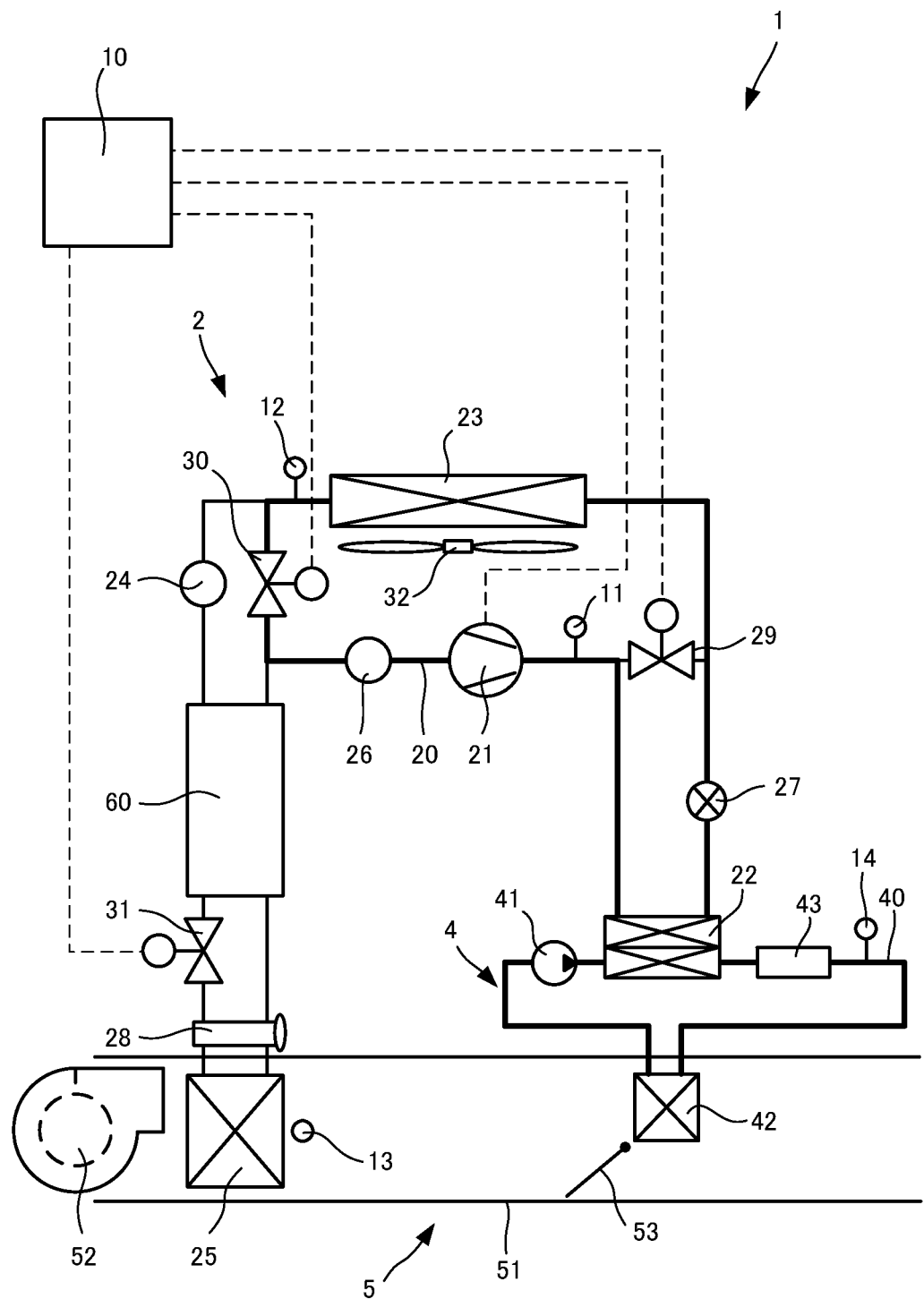
FIG. 4 is a diagram for explaining a cabin heating operation mode of the air-conditioning device.

FIG. 4 is a diagram for explaining a cabin heating operation mode of the air-conditioning device 1. In the cabin heating operation mode, so called outside-air heat-absorbing heat pump operation is performed, and the cooling medium in the cooling medium flow path 20 and the hot water in the hot water flow path 40 respectively circulate as shown by the thick-solid line in FIG. 4.

The controller 10 closes the first open/close valve 29 and the third open/close valve 31 and opens the second open/close valve 30. By doing so, the high-temperature cooling medium that has been compressed in the compressor 21 flows to the fluid-cooled the condenser 22.

The cooling medium that has reached the fluid-cooled the condenser 22 becomes low temperature as the heat thereof is taken away while heating the hot water in the fluid-cooled the condenser 22. Thereafter, the temperature of the cooling medium is further decreased by being decompressed and expanded by passing through the first expansion valve 27, and then, flows to the external heat exchanger 23. The cooling medium that has reached the external heat exchanger 23 is subjected to the heat exchange with the outside air introduced to the external heat exchanger 23 and heated. Thereafter, the cooling medium is subjected to the gas/liquid separation by flowing into the accumulator 26 via the second open/close valve 30. The gaseous cooling medium obtained from the cooling medium subjected to the gas/liquid separation in the accumulator 26 flows again to the compressor 21.

On the other hand, the hot water that has been heated with the cooling medium in the fluid-cooled the condenser 22 circulates and flows into the heater core 42, thereby heating the surrounding air of the heater core 42. Thus-heated air flows towards the downstream side of the HVAC unit 5 and is used as a cabin heating wind. In a case in which the hot water cannot be heated sufficiently with the cooling medium in the fluid-cooled the condenser 22, the hot water may also be heated by operating the auxiliary heating device 43 independently or in combination with the outside-air heat-absorbing heat pump operation.

Cabin Cooling Mode

Figure 5:
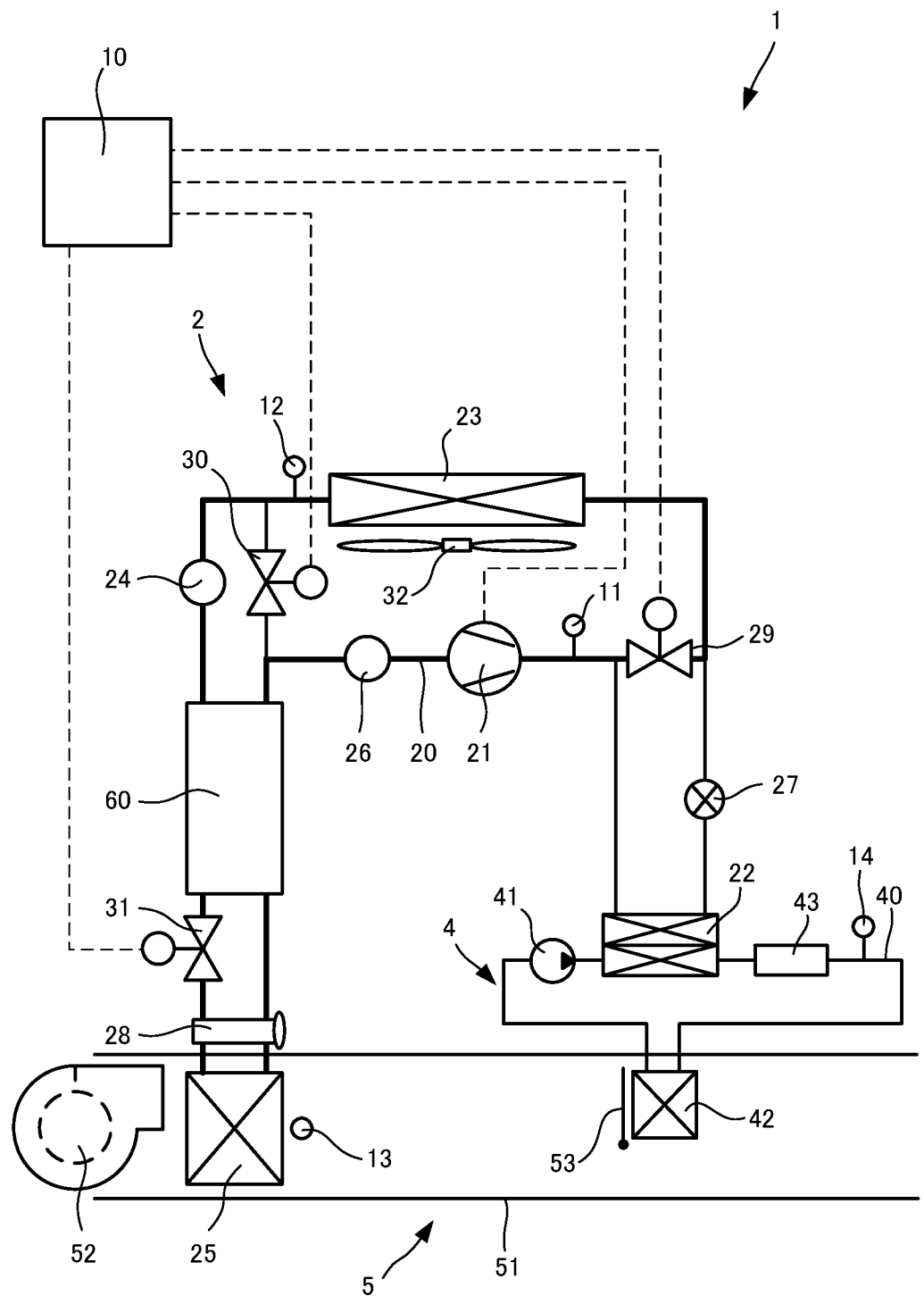
FIG. 5 is a diagram for explaining a cabin cooling mode of the air-conditioning device.

FIG. 5 is a diagram for explaining a cabin cooling mode of the air-conditioning device 1. In the cabin cooling mode, the cooling medium in the cooling medium flow path 20 circulates as shown by thick-solid line in FIG. 5.

The controller 10 closes the second open/close valve 30 and opens the first open/close valve 29 and the third open/close valve 31. By doing so, the high-temperature, high-pressure cooling medium that has been compressed in the compressor 21 flows to the external heat exchanger 23 through the first open/close valve 29.

The cooling medium that has reached the external heat exchanger 23 is cooled by being subjected to the heat exchange with the outside air introduced to the external heat exchanger 23, and thereafter, subjected to the gas/liquid separation through the liquid tank 24. As shown in FIG. 2, the liquid cooling medium obtained from the cooling medium subjected to the gas/liquid separation in the liquid tank 24 flows through the outer flow path 20b of the internal heat exchanger 60 that is connected to the downstream side of the liquid tank 24.

The liquid cooling medium flowing through the outer flow path 20b is a high-pressure fluid and is in a substantially saturated liquid state at which a degree of supercooling is about 0° C. after being subjected to the gas/liquid separation in the liquid tank 24.

On the other hand, the gaseous cooling medium flowing through the inner flow path 20a is a low pressure fluid that has being decompressed and expanded while passing through the second expansion valve 28 and that has been evaporated by being heated by the air while passing through the evaporator 25.

The inner flow path 20a is partitioned to each of the chamber 63a and the chamber 63b having the helical shape by the helical plate member 64. Therefore, the gaseous cooling medium flowing through the inner flow path 20a flows through each of the chambers 63a and 63b while being helically stirred by the plate member 64.

Because the pressure of the gaseous cooling medium that has been evaporated in the evaporator 25 is relatively lower than that of the liquid cooling medium that has been subjected to the gas/liquid separation in the liquid tank 24, on the basis of saturation temperature property of the cooling medium, the temperature of the gaseous cooling medium is lower than that of the liquid cooling medium in the saturated liquid state until it exceeds a predetermined degree of superheating.

Therefore, while the liquid cooling medium flows through the outer flow path 20b of the internal heat exchanger 60, the liquid cooling medium is super cooled by the gaseous cooling medium by being subjected to the heat exchange with the low-temperature gaseous cooling medium through the inner pipe 63. The supercooled liquid cooling medium becomes a supercooled state with the degree of supercooling from the saturated liquid state. In addition, the gaseous cooling medium flowing through the inner flow path 20a becomes a superheated state with the degree of superheating by being heated by the liquid cooling medium.

Furthermore, the gaseous cooling medium respectively flowing the chambers 63a and 63b of the inner flow path 20a is stirred by the helical plate member 64. Thus, greater amount of the gaseous cooling medium comes into thermal contact with the inner wall of the inner pipe 63, and so, it becomes easy to perform the heat exchange with the liquid cooling medium flowing through the outer flow path 20b via the inner pipe 63. It is also possible to perform the heat exchange between the gaseous cooling medium and the liquid cooling medium flowing through the outer flow path 20b through the plate member 64. As a result, the liquid cooling medium becomes the supercooled state with greater degree of supercooling by being further cooled by the gaseous cooling medium flowing through the inner flow path 20a helically.

Because the helical periodicity P of the plate member 64 has a longer period than the inner diameter Din of the inner pipe 63, when the gaseous cooling medium flows through each of the chambers 63a and 63b in the inner flow path 20a, the gaseous cooling medium can flow without increasing a pressure loss too much.

The liquid cooling medium that has become the supercooled state while flowing through the outer flow path 20b of the internal heat exchanger 60 further becomes lower temperature by being decompressed and expanded by passing through the second expansion valve 28, and then, the liquid cooling medium flows to the evaporator 25.

The liquid cooling medium that has reached the evaporator 25 is evaporated to the gaseous cooling medium by being heated by being subjected to the heat exchange with the air passing through the evaporator 25, and flows to the internal heat exchanger 60. At this time, because the liquid cooling medium is supercooled to the supercooled state, it is possible to further cool the air passing through the evaporator 25.

The cooling medium that has been evaporated by the heat exchange in the evaporator 25 and that has become the gaseous cooling medium flows to the inner flow path 20a of the internal heat exchanger 60, and as described above, cools the liquid cooling medium flowing through the outer flow path 20b through the inner pipe 63. After being heated by the liquid cooling medium, the gaseous cooling medium flows again to the compressor 21 through the accumulator 26 and compressed.

On the other hand, the air that has been cooled by the cooling medium in the evaporator 25 flows to the downstream side of the HVAC unit 5, and thereby, it is used as a cabin cooling operation wind.

A dehumidifying wind can also be obtained (dehumidifying mode) by cooling the air in the evaporator 25 to condense and remove water vapor in the air, and thereafter, by reheating the air the heater core 42.

According to the embodiment mentioned above, the advantages described below are afforded.

The double pipe 61 includes the inner pipe 63 through an interior of which the gaseous cooling medium serving as low-pressure first fluid flows and the outer pipe 62 having the inner pipe 63 in its interior, the outer pipe 62 being configured such that the liquid cooling medium serving as high-pressure second fluid flows between the inner pipe 63 and the outer pipe 62. The inner pipe 63 has the plate member 64 extending in the longitudinal direction so as to partition the interior of the inner pipe 63 into a plurality of the chambers 63a and 63b. The plate member 64 has helical shape along the longitudinal direction.

With the double pipe 61 described above, because the helical plate member 64 is extended in the longitudinal direction so as to partition the interior of the inner pipe 63 into the plurality of the chambers 63a and 63b, the gaseous cooling medium flowing through the interior of the inner pipe 63 is stirred by the plate member 64. In addition, the gaseous cooling medium is subjected to the heat exchange with the liquid cooling medium not only through the inner pipe 63 but also through the plate member 64. Furthermore, because the inner pipe 63 is held helically from the inside of the inner pipe 63 by the helical plate member 64, the rigidity is increased over the whole radial directions. As a result, the inner pipe 63 is prevented from being crushed due to an internal/external pressure difference, and it is possible to improve the heat exchange efficiency between the gaseous cooling medium and the liquid cooling medium through the inner pipe 63 and the plate member 64.

The double pipe 61 has the bent portion 61a formed by bending the inner pipe 63 and the outer pipe 62. In the interior of the inner pipe 63 at the bent portion 61a, the plate member 64 is arranged. The inner pipe 63 at the bent portion 61a tends to have a thinner wall at the outer side thereof because the outer side is tensioned and stretched. However, when the plate member 64 is arranged in the bent portion 61a, the plate member 64 is also bent in the interior of the inner pipe 63 and is fit and fixed to the inner wall of the inner pipe 63. As a result, the rigidity of the inner pipe 63 is increased as the stress applied to the inner pipe 63 is distributed by the plate member 64 in a three dimensional manner, and thereby, even when the outer side of the inner pipe 63 at the bent portion 61a is stretched and become thin, it is possible to suppress the crush of the inner pipe 63.

In the double pipe 61, the plate thickness of the inner pipe 63 is thinner than the plate thickness of the outer pipe 62. With such a configuration, it is possible to further improve the heat exchange efficiency between the gaseous cooling medium and the liquid cooling medium through the inner pipe 63. In addition, even when the plate thickness of the inner pipe 63 is thinner than the plate thickness of the outer pipe 62, because the inner pipe 63 is helically held from the inside by the plate member 64 and the rigidity of the inner pipe 63 is increased over the whole radial directions, it is possible to suppress the crush of the inner pipe 63 due to the internal/external pressure difference.

Furthermore, in the double pipe 61, the inner pipe 63 and the plate member 64 are formed separately. In other words, the inner pipe 63 can easily be formed by processing to a tubular shape, and the plate member 64 can easily be formed by supporting both ends in the longitudinal direction and by rotating one end about the central axis in the longitudinal direction. Therefore, as compared with a case in which the inner pipe 63 and the plate member 64 are formed integrally, it is possible to easily form the inner pipe 63 and the plate member 64 and to increase a processing efficiency by forming the inner pipe 63 and the plate member 64 separately and by inserting the plate member 64 into the inner pipe 63 and fitting and fixing thereto.

The helical periodicity P of the plate member 64 is longer than the inner diameter Din of the inner pipe 63. Therefore, the gaseous cooling medium flowing through the inner flow path 20a of the interior of the inner pipe 63 is stirred so as not to increase the pressure loss, and thereby, it is possible to improve the heat exchange performance while suppressing application of excessive load to the compressor 21.

In order to stir the gaseous cooling medium flowing through the inner flow path 20a with reliability, it is preferable that the helical periodicity P of the plate member 64 be set so as to be equal to or greater than one period along the longitudinal direction of the plate member 64. In addition, it is preferable that the helical periodicity P of the plate member 64 be set so as to be equal to or less than 3 times the radius of curvature of the outer pipe 62 at the bent portion 61a in order to increase a stirring performance of the gaseous cooling medium.

Although the embodiment of the present invention has been described in the above, the above-mentioned embodiment merely illustrates a part of application examples of the present invention, and the technical scope of the present invention is not intended to be limited to the specific configurations in the above-mentioned embodiments.

For example, in the above-mentioned embodiment, the plate member 64 to be inserted into the interior of the inner pipe 63 partitions the interior of the inner pipe 63 into two chambers 63a and 63b; however, the plate member 64 may partition the interior of the inner pipe 63 into a plurality of chambers including three or more chambers.

In addition, the plate member 64 is not limited to the aspect in which it completely partitions the interior of the inner pipe 63 into the chamber 63a and the chamber 63b. The plate member 64 may have a width that is shorter than the inner diameter Din of the inner pipe 63, and thereby, only a part of the interior of the inner pipe 63 may be partitioned along the longitudinal direction. Even with the plate member 64 having such a configuration, the gaseous cooling medium can be stirred, and so, it is possible to improve the heat exchange efficiency of the internal heat exchanger 60.

Figure 6:
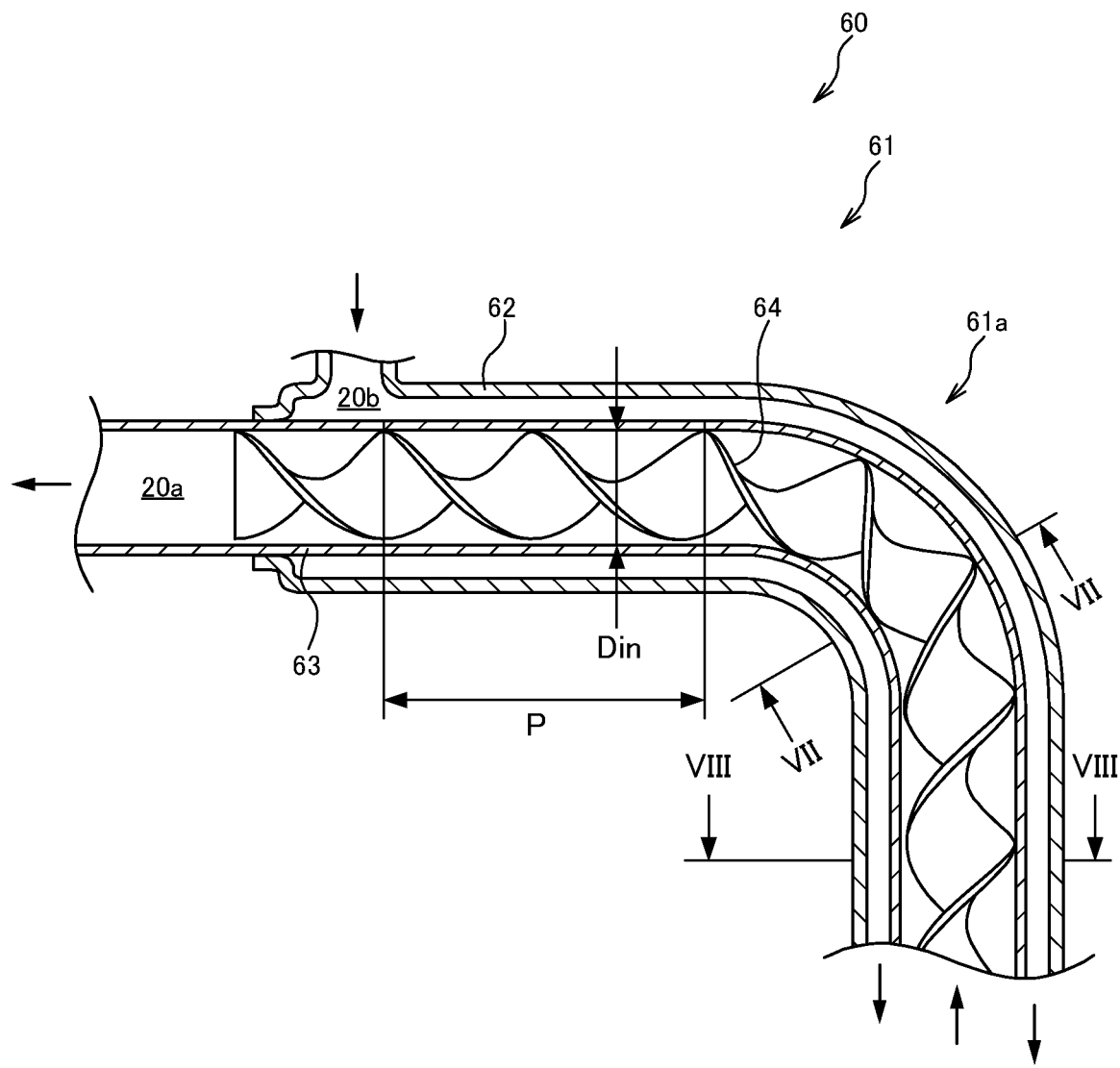
FIG. 6 is a schematic configuration diagram of the double pipe according to an example.
Figure 7:
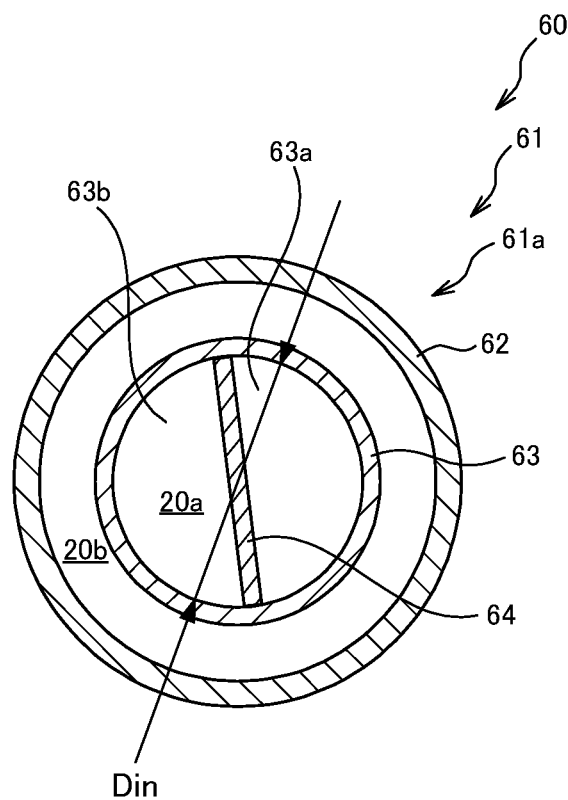
FIG. 7 is a sectional view taken along a line VII-VII in FIG. 6.
Figure 8:
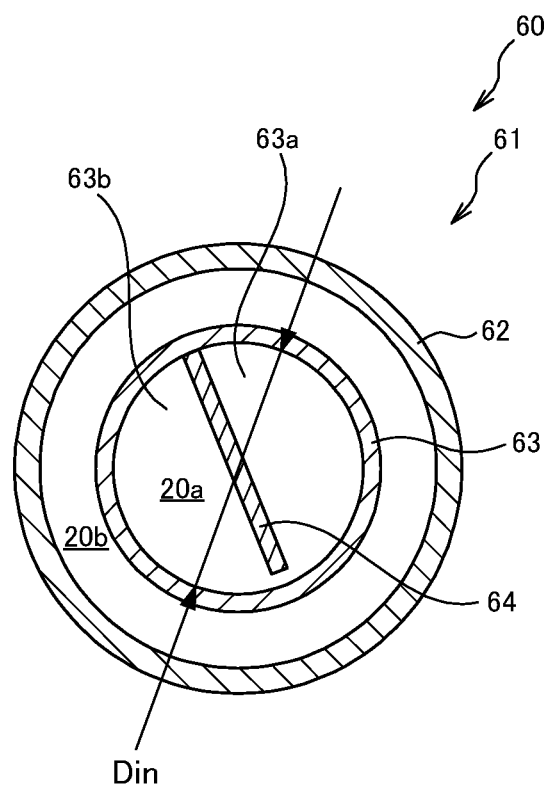
FIG. 8 is a sectional view taken along a line VIII-VIII in FIG. 6.

Furthermore, the double pipe 61 according to the example to which the above-mentioned embodiment is applied will be described with reference to FIGS. 6 to 8. FIG. 6 is a schematic configuration diagram of the double pipe 61 according to the example. FIG. 7 is a sectional view taken along a line VII-VII in FIG. 6, and FIG. 8 is a sectional view taken along a line VIII-VIII in FIG. 6. In the following example, components having the same function as those in the above-mentioned embodiment are assigned the same reference signs, and explanation will be made by appropriately omitting repetitive descriptions.

As shown in FIG. 6, the plate member 64 is inserted into the interior of the inner pipe 63 of the double pipe 61. As a description has been given in the above-mentioned embodiment, by twisting the plate member 64 to the helical shape, the size thereof becomes slightly smaller than the inner diameter Din of the inner pipe 63, and therefore, the plate member 64 can be inserted into the inner pipe 63. Thus, before a bending processing for bending a part of the inner pipe 63, a small gap is formed between the plate member 64 inserted into the interior of the inner pipe 63 and the inner wall of the inner pipe 63.

Thereafter, as a part of the inner pipe 63 is bent in a state in which the plate member 64 is inserted therein, the plate member 64 is fit and fixed to the inner wall of the inner pipe 63.

As shown in FIGS. 6 and 7, the gap between the inner pipe 63 and the plate member 64 is not formed at the bent portion 61a. Because the plate member 64 is fit and fixed by being sandwiched from both sides with the inner wall of the inner pipe 63 by the bending processing, the gap between the inner pipe 63 and the plate member 64 that has been present before the bending processing is filled after the bending processing. As a result, the plate member 64 is brought into contact with the inner part of the inner pipe 63 at the bent portion 61a and holds the inner pipe 63 from the inside of the inner pipe 63.

On the other hand, as shown in FIGS. 6 and 8, the gap formed between the inner pipe 63 and the plate member 64 is maintained unfilled at positions other than the bent portion 61a.

When the plate member 64 is bent together with the inner pipe 63, a force against the bending processing is applied to the plate member 64 by the rigidity of the plate member 64 itself in the direction in which its original shape before bending is to be maintained. Therefore, as shown in FIGS. 6 and 8, the position of the plate member 64 after the bending processing is deviated in the interior of the bent inner pipe 63, and the plate member 64 is brought into contact with the inner wall of the inner pipe 63 on the outer side in the bending direction. As described above, because a part of the plate member 64 is brought into contact with the inner pipe 63 at a position other than the bent portion 61a, it is possible to improve, in the double pipe 61 as a whole, the heat exchange efficiency between the gaseous cooling medium in the interior of the inner pipe 63 and the liquid cooling medium on the outside of the inner pipe 63 through the plate member 64 and the inner pipe 63. In addition, because width of the gap formed between the inner pipe 63 and the plate member 64 is small, most of the gaseous cooling medium flowing through the interior of the inner pipe 63 is stirred by the helical plate member 64. Therefore, it is possible to improve the heat exchange efficiency between the gaseous cooling medium and the liquid cooling medium in the double pipe 61 as a whole with the helical plate member 64.

In addition, the position of the plate member 64 after the bending processing may not be deviated in the interior of the inner pipe 63, and gaps may be evenly formed between the inner pipe 63 and both ends of the plate member 64. Similarly to a case in which the position of the plate member 64 is deviated in the inner pipe 63, the widths of the gaps formed between the inner pipe 63 and the plate member 64 are small, and therefore, most of the gaseous cooling medium flowing through the interior of the inner pipe 63 is stirred by the helical plate member 64. Therefore, even in a case in which the gaps are evenly formed between the inner pipe 63 and both end sides of the plate member 64, it is possible to improve the heat exchange efficiency between the gaseous cooling medium and the liquid cooling medium in the double pipe 61 as a whole with the helical plate member 64.

With the double pipe 61 according to such an example, because the plate member 64 is brought into contact with the inner part of the inner pipe 63 at the bent portion 61a and holds the inner pipe 63 from the inside of the inner pipe 63, crush of the bent portion 61a is suppressed, and therefore, reduction in passage area in the inner pipe 63 is suppressed. In addition, because the plate member 64 is formed to have a helical shape and holds the inner pipe 63 from the inside of the inner pipe 63 in a helical manner, bending rigidity is not maintained at high state when the inner pipe 63 is subjected to the bending processing, and so, it is possible to avoid concentration of the crush. As a result, it is possible to suppress the concentration of wrinkles on the inside of the inner pipe 63 as the inner pipe 63 is bent, and so, it is possible to suppress the reduction in the passage area.

In addition, because the helical plate member 64 is interposed in the inner pipe 63, as compared with the case in which a flat partition plate that has not been twisted is simply interposed in the inner pipe 63, it is possible to suppress inward crush of the entire inner pipe 63 over the longitudinal direction and the circumferential direction of the inner pipe 63. Furthermore, because the helical plate member 64 helically holds the inner pipe 63 at the bent portion 61a from the inside thereof, it is possible to avoid a situation in which a holding force is applied only to the one side surface of the inner pipe 63, it is possible to suppress the crush and occurrence of wrinkles in the inner pipe 63, and it is possible to suppress the reduction in the passage area.

The above-mentioned embodiments may be combined appropriately. For example, the shape of the inner pipe 63 is not limited to a circular pipe, the inner pipe 63 may be formed to have a helical groove, and the helical plate member 64 may be in contact with an incircle of a helical groove portion.

This application claims priority based on Japanese Patent Application No. 2016-049833 filed with the Japan Patent Office on Mar. 14, 2016, the entire contents of which are incorporated into this specification.

The invention claimed is:

1. A double pipe comprising an inner pipe having an interior configured to allow a low-pressure first fluid flow therethrough and an outer pipe having the inner pipe in its interior, the outer pipe being configured to allow a high-pressure second fluid to flow between the inner pipe and the outer pipe, further comprising:
   a bent portion formed by bending the inner pipe and the outer pipe, wherein
   the inner pipe has a plate member extending in a longitudinal direction so as to partition the interior of the inner pipe into a plurality of chambers,
   a plate thickness of the inner pipe is thinner than a plate thickness of the outer pipe, and
   the plate member has a helical shape along the longitudinal direction, the plate member being in contact with an inner part, including an inner circumferential portion and an outer circumferential portion, of the inner pipe at the bent portion,
   wherein a gap is formed between the plate member at its largest width and the inner pipe in a region other than the bent portion, wherein the plate member has a helical periodicity P where the helical periodicity P is equal to or less than 3 times the radius of curvature of the plate member.

2. The double pipe according to claim 1, wherein the inner pipe and the plate member are formed separately.

3. The double pipe according to claim 1, wherein a helical periodicity of the plate member is longer than an inner diameter of the inner pipe.

4. The double pipe according to claim 1, wherein the plate member has a width in the radial direction of the inner pipe smaller than an inner diameter of the inner pipe in the region other than the bent portion.

* * * * *